(12) United States Patent
Bartik et al.

(10) Patent No.: US 7,983,372 B2
(45) Date of Patent: Jul. 19, 2011

(54) METHOD, SYSTEM AND COMPUTER PROGRAM PRODUCT FOR AN EVEN SAMPLING SPREAD OVER DIFFERING CLOCK DOMAIN BOUNDARIES

(75) Inventors: Jane H. Bartik, Poughkeepsie, NY (US); Willm Hinrichs, Holzgerlingen (DE); Martin Recktenwald, Steinenbronn (DE); Patrick M. West, Jr., Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 12/031,158

(22) Filed: Feb. 14, 2008

(65) Prior Publication Data
US 2009/0207958 A1 Aug. 20, 2009

(51) Int. Cl.
*H04L 7/00* (2006.01)
(52) U.S. Cl. ....................................... 375/355
(58) Field of Classification Search .................. 375/354, 375/355, 357, 369, 372, 373, 374; 370/395.62, 370/507; 455/265; 702/89; 713/375, 400
See application file for complete search history.

(56) References Cited

U.S. PATENT DOCUMENTS

| | | | |
|---|---|---|---|
| 6,065,126 A | 5/2000 | Tran et al. | |
| 6,182,236 B1 * | 1/2001 | Culley et al. | 713/503 |
| 6,449,728 B1 | 9/2002 | Bailey | |
| 6,930,955 B2 | 8/2005 | Johnson et al. | |
| 7,042,840 B2 | 5/2006 | Howald et al. | |
| 7,043,654 B2 * | 5/2006 | Khondker et al. | 713/500 |
| 7,194,650 B2 | 3/2007 | Adkisson | |
| 2006/0208766 A1 * | 9/2006 | Ogura et al. | 327/12 |
| 2007/0266284 A1 | 7/2007 | Kwak | |
| 2008/0101523 A1 * | 5/2008 | Kurd et al. | 375/376 |

OTHER PUBLICATIONS

International Business Machines Corporation (IBM), z/Architecture Principles of Operations, Sixth Edition (Apr. 2007), 1216 pages (split into 4 parts.

* cited by examiner

*Primary Examiner* — Sam K Ahn
(74) *Attorney, Agent, or Firm* — Cantor Colburn LLP; John Campbell

(57) ABSTRACT

The present invention relates to a method, computer program product and system for generating a sample signal from differing clock domain boundaries. The system comprises a cycle base component, a sample offset component being configured to receive a time-based sample pulse signal, and logic to generate a sample pulse. The sample pulse generation logic is configured to receive a time-based sample pulse signal, a free running counter value, a sample offset counter value, and deliver a sample pulse signal.

19 Claims, 2 Drawing Sheets

METHOD, SYSTEM AND COMPUTER PROGRAM PRODUCT FOR AN EVEN SAMPLING SPREAD OVER DIFFERING CLOCK DOMAIN BOUNDARIES

BACKGROUND OF THE INVENTION

This invention relates generally to clock boundary sampling and more particularly to the obtaining even distributions of samples across differing clock domain boundaries.

Present generations of microprocessors typically include multiple clock boundaries that are situated both on and off chip. Data sampling hardware facilities that are dedicated to sampling data relating to the state of a processor during the execution of applications are affected by these varying clock boundaries. In general, a clock signal that is originated by a partition within a processing system comprising a clock boundary of a variable X-to-1 clock boundary is returned to a data capture component of the microprocessor, wherein the data capture component typically operates on a 1-to-1 clock boundary. The data capture aspect is controlled by a programmable sampling pulse, wherein it is usually specified that a predetermined number of cycles be executed between sampled pulses. The data capture hardware configures a cycle countdown value to be a predetermined value and thereafter decrements the value for each cycle until the value reaches zero (0). As a result of the completed countdown cycle a sample pulse is generated and the countdown value is reset to the predetermined value.

Generated sample pulses are time based in order to avoid any biases towards or away from system events. However unless this pulse is evenly spread across all clock boundaries the signals coming from other than a 1-to-1 clock boundary will be biased in a more subtle way. For example, assume that a 2-to-1 clock boundary segment of a computing system always returns its clocking signals on an even cycle. Therefore, a sample pulse that correlates to the even cycle will sample 2× the signal being high versus the actually signal. And further, a sample pulse that correlates to an odd cycle will never sample the signal being high.

Previously, this issue was solved by forcing a sample rate to be such that a sample pulse would be evenly distributed across all clock boundaries. Thus, in the 2-to-1 clock boundary example the sample rate would be compensated to ensure that the sample pulse toggled between an even or odd cycle. This solution works well as long as the sampling hardware continuously runs during the measurement period and the number of clock boundaries within the system is small. In the presence of multiple partitions that each want to control their sampling independently and multiple clock boundaries that make selecting an appropriate sample rate more difficult, additional hardware is needed to enforce a uniform distribution of sample pulses across clock boundaries.

Any mechanism that relies solely on saving/restoring operation by firmware of cycles to the next sample pulse on partition change is vulnerable to any biases that are introduced by the process of entering a new partition. Thus, a new partition could always enter on a particular clock boundary and bias its next sample pulse towards certain clock boundaries.

BRIEF SUMMARY OF THE INVENTION

An exemplary embodiment includes a system for generating a sample signal from differing clock domain boundaries. The system comprises a cycle base component, a sample offset component configured to receive a time-based sample pulse signal, and logic to generate a sample pulse. The sample pulse generation logic is configured to receive a time-based sample pulse signal, a free running counter value, a sample offset counter value, and deliver a sample pulse signal.

Another exemplary embodiment includes a method for generating a sample signal from differing clock domain boundaries. The method comprises delivering a time-based sample pulse signal to a sample offset component, delivering the time-based sample pulse signal to logic for the delayed delivery of a sample pulse signal, and retrieving an incremental cycle base value. The method also comprises retrieving an incremental sample offset value, delivering the incremental cycle base value and sample offset value to the sample pulse generation logic, and generating a sample pulse signal based upon a comparison of the incremental cycle base value to the incremental sample offset value.

A further exemplary embodiment includes a computer program product that includes a computer readable medium useable by a processor. The medium having stored thereon a sequence of instructions which, when executed by the processor, causes the processor to generate a sample signal from differing clock domain boundaries by delivering a time-based sample pulse signal to a sample offset component, and delivering the time-based sample pulse signal to logic for the delayed delivery of a sample pulse signal. Further performed is the retrieving of an incremental cycle base value, retrieving an incremental sample offset value, delivering the incremental cycle base value and sample offset value to the sample pulse generation logic, and generating a sample pulse signal base upon a comparison of the incremental cycle based value to the incremental sample offset value.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the invention is described below in detail. The disclosed embodiment is intended to be illustrative only since numerous modifications and variations therein will be apparent to those of ordinary skill in the art. Aspects of the exemplary embodiment of the present invention can be implemented within a conventional computing system environment comprising hardware and software elements.

Presently, microprocessors typically include multiple clock boundaries that can be situated either on or off chip. Data sampling hardware facilities that are dedicated to sampling data relating to the state of a processor during the execution of applications are affected by these varying clock boundaries. In general, a clock signal that is originated by a part of processing system comprising a clock boundary of a variable X-to-1 clock boundary is returned to a data capture component of the microprocessor, wherein the data capture component operates on a 1-to-1 clock boundary. The data capture aspect is controlled by a programmable sampling pulse, the programmable specifying that a predetermined number of cycles be executed between sample pulses. The data capture hardware configures a cycle countdown value to be a predetermined value, and thereafter decrements every cycle until it reaches zero.

As a result of the completed countdown cycle a sample pulse is generated and the countdown value is reset to the predetermined value. The generated sample pulse is time based in order to avoid any biases towards or away from system events. However unless this pulse is evenly spread across all clock boundaries the signals coming from other than a 1-to-1 clock boundaries will be biased in a more subtle way.

The exemplary embodiment of the present invention comprises a solution for providing an evenly distributed sample pulse across differing clock boundary domains. As such, the exemplary embodiment requires the implementation of hardware components comprising a cycle base component and a sample offset component in addition to logic that is implemented to utilize a compare between the outputs of the cycle base and sample offset components in order to control the generation of a sample pulse. The cycle base component serves as an always running component that is implemented to track a cycle in terms of the clock boundaries of a system. The sample offset component serves to control the cycle on which a sample pulse is allowed to be sampled on, while the compare logic serves as delay for timed sample pulse generation operations.

Figure 1:
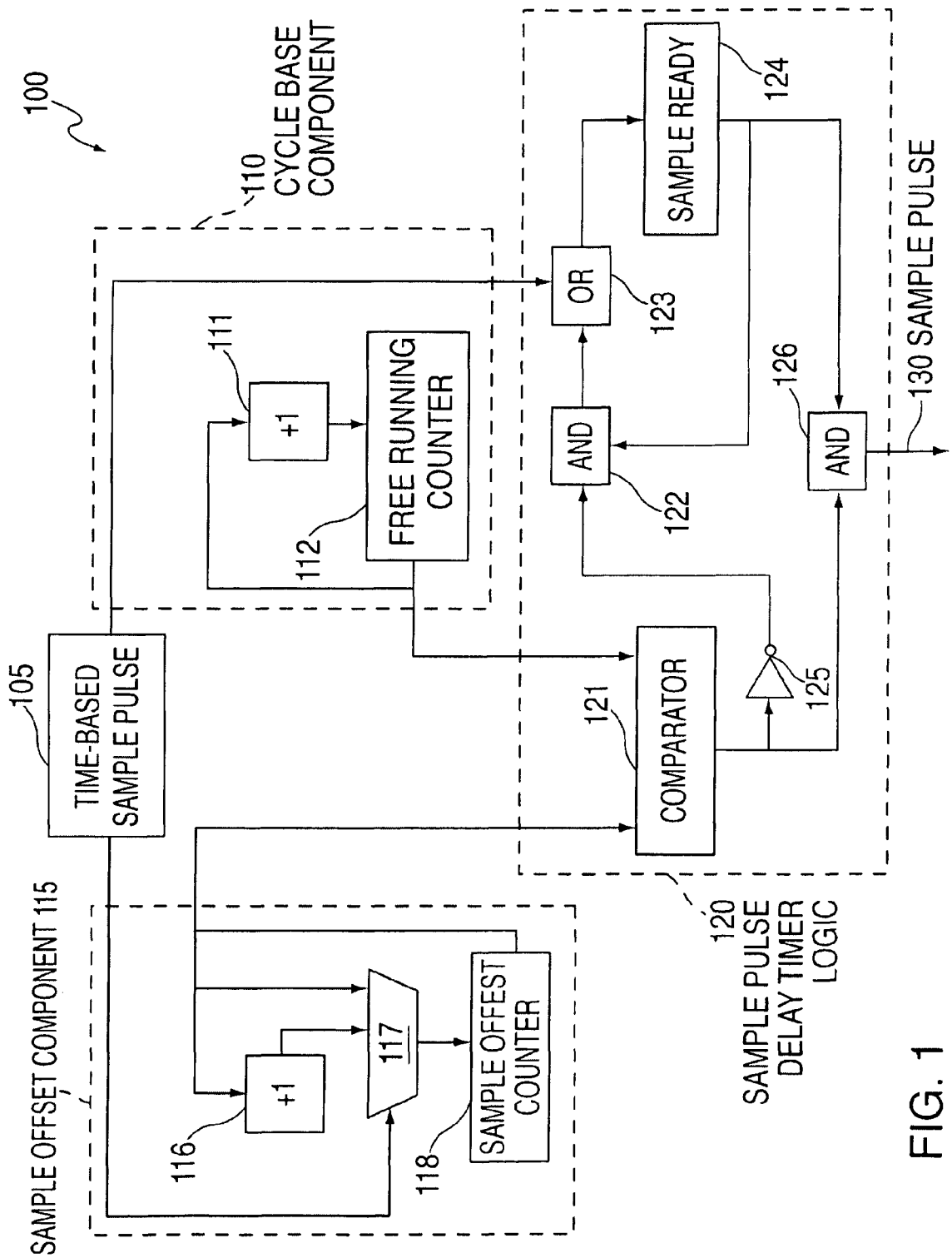
FIG. 1 is a diagram of an un-biasing logic hardware configuration in accordance with an exemplary embodiment of the present invention.

FIG. 1 shows a diagram of un-biasing logic hardware 100 in accordance with the exemplary embodiment of the present invention. As shown, the un-biasing logic hardware 100 comprises a time-based sample pulse generator 105, a cycle base component 110, a sample offset component 115. and sample pulse delay timer logic 120. The sample offset component 115 controls which cycle the next sample pulse received from the time-based sample generator 105 is allowed to be sampled on (i.e., the sample offset). The sample offset counter register 118 value of the sample offset component 115 can be saved or restored on partition switch by firmware.

The cycle base component (or sample base component) 110 is implemented to keep count of each cycle that the un-biasing logic hardware 100 count is on in relation to the clock boundaries of a computing system. For example, for a computing system that comprises 1-to-1, 2-to-1, or 3-to-1 clock boundaries, the cycle base component 110 repetitively and continuously counts each cycle for a range from 0 to value MAX. Within the exemplary embodiment MAX represents the differing clock boundaries within a target system multiplied together minus 1. Therefore, if we have a set of clock boundaries comprising 1:X and 1:Y, then MAX will equal (X·Y)−1. For example, in the instance that for the particular implementation X=2 and Y=3, then MAX=(2·3)−1=5, thus resulting in a repetitive and continuous count for each cycle of 0, 1, 2, 3, 4, 5, 0, 1 . . . . Within the exemplary embodiment the cycle base component is never reset and thus serves as a continuous cycle base reporting component. The sample pulse delay timer logic 120 is implemented to delay the time-based sample pulse delivered from the time-based sample pulse generator 105 until the free running counter register 112 value has reached the sample offset counter register 118 value. As mentioned in regard to the cycle base component 110, the sample offset component 115 is tasked to repetitively and incrementally to count through a range from 0 to a value MAX, wherein MAX=(X·Y)−1 for clock boundaries comprising 1:X and 1:Y. Within the exemplary embodiment, when the data capture hardware has decremented each of it prescribed cycles until it reaches zero for the generation and delivery of a sample pulse, then the data capture hardware must wait until the register values that have been stored at the sample offset counter register 118 and the free running counter register 112 match.

As shown in FIG. 1, the exemplary sample offset component 115 comprises a 2:1 multiplexer 117, wherein the multiplexer 117 is configured to receive a time-based sample pulse signal and input from the sample offset counter register 118 and an adder 116. The cycle base component comprises an adder 111 and a free running counter register 112. The outputs from the sample offset counter register 118 and the free running counter register 112 are delivered to a comparator 121 at the sample pulse delay timer logic 120. The comparator 121 is in communication with a logic configuration comprising a NOR logic gate 125, two AND logic gates 122, 126, an OR logic gate, and a sample pulse register 124. As mentioned above, when the cycle countdown to the next sample pulse reaches zero, the sample pulse is delayed until the sample offset register 118 value and the free running counter register 112 value are determined to match at the comparator 121.

Figure 2:
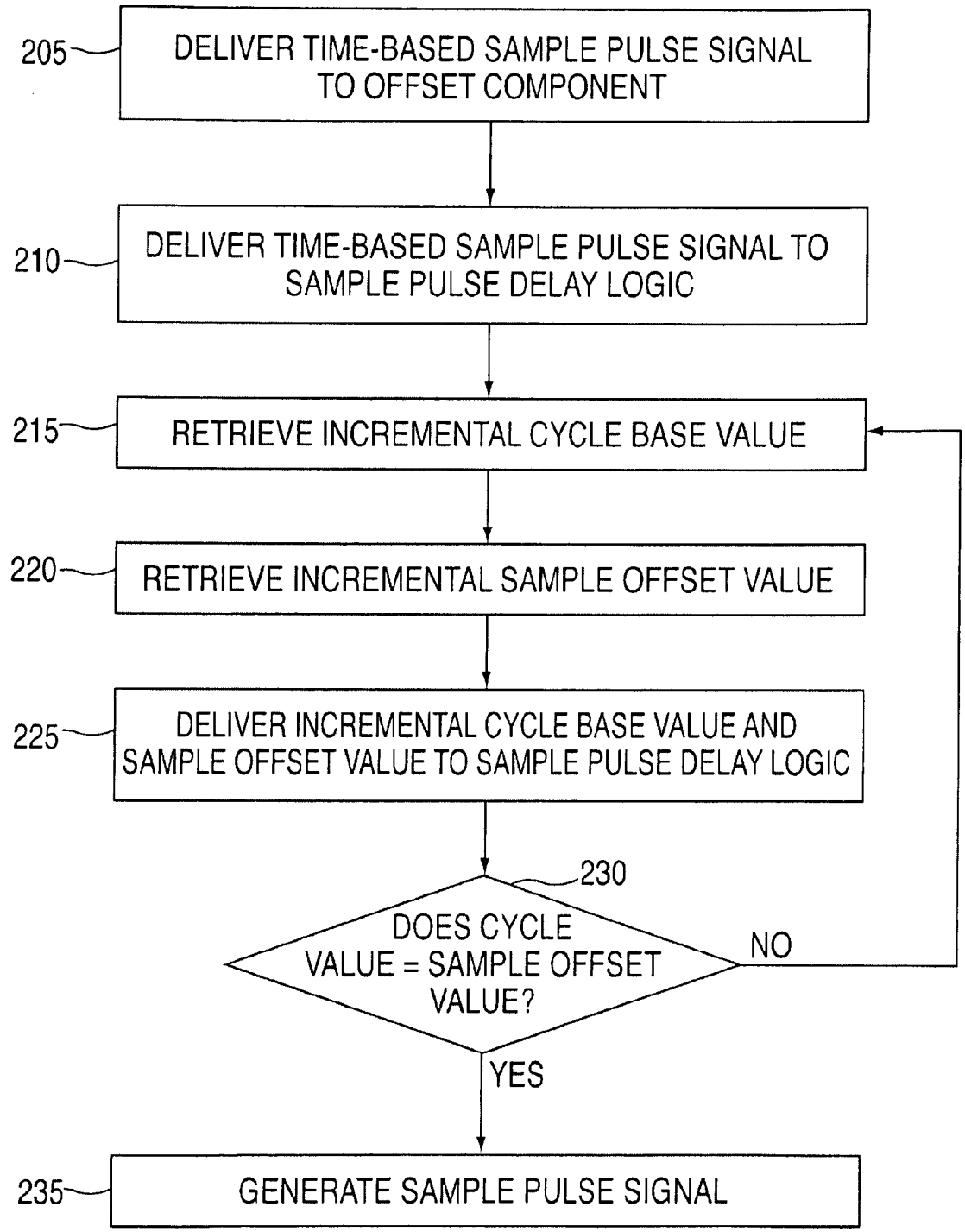
FIG. 2 is a flow diagram of a method for generation a sample signal from differing clock domain boundaries in accordance with an exemplary embodiment of the present invention.

FIG. 2 shows a flow diagram detailing a method for generating a sample pulse signal from differing clock domain boundaries. At step 205 a time-based sample signal is delivered to the sample offset component 115. The sample pulse delay timer logic 120 being implemented to delay the time-based sample pulse delivered from the time-based sample pulse generator 105 until the free running counter register 112 value has reached the sample offset counter register 118 value. Further, the sample offset component 115 repetitively and incrementally counts through a range from 0 to MAX on each sample that is taken (e.g., 0, 1, 2, 3, 4, 5, 0, 1 . . . ). At step 210, the time-based sample pulse signal is delivered to the sample pulse delay timer logic 120.

Respectively, at steps 215 and 220, the incremental cycle base value is retrieved from the free running counter register 112 and the incremental sample offset value is retrieved from the sample offset counter register 118. At step 225, the incremental cycle base value and incremental sample offset value are delivered to the comparator 121 at the sample pulse delay timer logic 120. Next, at step 230, a determination is made at the comparator 121 if the incremental cycle base value is equal to the incremental sample offset value. In the instance that the compared values are not equal then the method returns to step 215. In the instance that the values are equal, then at step 235, the sample pulse signal 130 is generated.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed:

1. A system for generating a sample signal from differing clock domain boundaries, the system comprising:
    a cycle base component;
    a sample offset component, the sample offset component configured to receive a time-based sample pulse signal; and
    logic to generate a sample pulse, the sample pulse generation logic being configured to receive the time-based sample pulse signal, a free running counter value, a sample offset counter value, and to deliver a sample pulse signal.

2. The system of claim 1, wherein the cycle base component comprises a free running counter.

3. The system of claim 2, wherein the free running counter is configured to continuously count each cycle value within a predetermined cycle value range for a clock boundary cycle without being reset.

4. The system of claim 3, wherein each cycle value is delivered to a comparator comprised within the sample pulse generation logic.

5. The system of claim 4, wherein the cycle values are comprised within the cycle value range from 0 to $(X \cdot Y)-1$, for a set of clock boundaries comprising $1:X$ and $1:Y$, wherein X is a first upper boundary and Y is a second upper boundary.

6. The system of claim 4, wherein the sample offset component comprises a sample offset counter.

7. The system of claim 6, wherein the sample offset component is configured to control the cycle that a sample pulse is allowed to sample.

8. The system of claim 7, wherein the sample offset component incrementally counts each sample offset value within a predetermined offset value range for each obtained sample.

9. The system of claim 8, wherein each sample offset value is delivered to a comparator comprised within the sample pulse generation logic.

10. The system of claim 9, wherein the offset value range comprises values in the range from 0 to $(X \cdot Y)-1$, for a set of clock boundaries comprising $1:X$ and $1:Y$, wherein X is a first upper boundary and Y is a second upper boundary.

11. The system of claim 9, where in the instance that the cycle base value is determined to be equal to the sample offset value, then a sample pulse is generated.

12. A method for generating a sample pulse signal from differing clock domain boundaries, the method comprising:
    delivering a time-based sample pulse signal to a sample offset component;
    delivering the time-based sample pulse signal to logic for the delayed delivery of the sample pulse signal;
    retrieving an incremental cycle base value;
    retrieving an incremental sample offset value;
    delivering the incremental cycle base value and the incremental sample offset value to the sample pulse generation logic; and
    generating a sample pulse signal based upon a comparison of the incremental cycle base value to the incremental sample offset value.

13. The method of claim 12, wherein cycles for a clock boundary are tracked by continuously incrementally counting each cycle base value within a predetermined cycle base value range.

14. The method of claim 13, wherein the predetermined cycle base value range comprises values that are continuously counted in the range of 0 to $(X \cdot Y)-1$, for a set of clock boundaries comprising $1:X$ and $1:Y$, wherein X is a first upper boundary and Y is a second upper boundary.

15. The method of claim 13, wherein for each sample that is obtained the sample offset value is incrementally counted in the range of 0 to $(X \cdot Y)-1$, for a set of clock boundaries comprising $1:X$ and $1:Y$, wherein X is a first upper boundary and Y is a second upper boundary.

16. A computer program product that includes a tangible computer readable medium useable by a processor, the tangible computer readable medium having stored thereon a sequence of instructions which, when executed by the processor, causes the processor to generate a sample signal from differing clock domain boundaries, by:
    delivering a time-based sample pulse signal to a sample offset component;
    delivering the time-based sample pulse signal to logic for the delayed delivery of the sample pulse signal;
    retrieving an incremental cycle base value;
    retrieving an incremental sample offset value;
    delivering the incremental cycle base value and the incremental sample offset value to the sample pulse generation logic; and
    generating a sample pulse signal based upon a comparison of the incremental cycle base value to the incremental sample offset value.

17. The computer program product of claim 16, wherein cycles for a clock boundary are tracked by continuously incrementally counting each cycle base value within a predetermined cycle base value range.

18. The computer program product of claim 17, wherein the predetermined cycle base value range comprises values that are continuously counted in the range of 0 to $(X \cdot Y)-1$, for a set of clock boundaries comprising $1:X$ and $1:Y$, wherein X is a first upper boundary and Y is a second upper boundary.

19. The computer program product of claim 17, wherein for each sample that is obtained the sample offset value is incrementally counted in the range of 0 to $(X \cdot Y)-1$, for a set of clock boundaries comprising $1:X$ and $1:Y$, wherein X is a first upper boundary and Y is a second upper boundary.

* * * * *